United States Patent [19]
Dabanian et al.

[11] 3,937,081
[45] Feb. 10, 1976

[54] VORTEX FLOWMETER

[75] Inventors: Karnig H. Dabanian, Farmington; Lawrence F. Rapp, Southfield; Dale C. Good, Plymouth, all of Mich.

[73] Assignee: Cox Instrument Division, Lynch Corporation, Detroit, Mich.

[22] Filed: Oct. 1, 1973

[21] Appl. No.: 402,075

[52] U.S. Cl. .............................. 73/194 C; 73/229
[51] Int. Cl.² ...................... G01F 1/06; G01F 1/32
[58] Field of Search ..................... 73/194 C, 229

[56] References Cited
UNITED STATES PATENTS

| | | | |
|---|---|---|---|
| 3,131,561 | 5/1964 | Romanowski | 73/229 |
| 3,230,767 | 1/1966 | Heigl et al. | 73/229 X |
| 3,256,736 | 6/1966 | Lee et al. | 73/229 |
| 3,447,373 | 6/1969 | McNabb | 73/229 |
| 3,605,729 | 9/1971 | Liu et al. | 73/229 X |

FOREIGN PATENTS OR APPLICATIONS

| | | | |
|---|---|---|---|
| 529,615 | 11/1940 | United Kingdom | 73/229 |

*Primary Examiner*—James J. Gill
*Attorney, Agent, or Firm*—Gaylord P. Haas, Jr.

[57] ABSTRACT

A vortex type flowmeter having a body member, a cover member and an interior varying diameter cavity formed in the body member in which fluid is introduced to flow in a generally helical pattern within the cavity, the fluid being introduced at the periphery of the cavity having the largest diameter and the fluid exiting from an aperture at the center of the vortex formed by the helical flow. The flowmeter includes a toothed rotor mounted for rotation within the cavity and the flow of fluid causes the rotor to rotate within the cavity at a rotational rate which is generally directly related to the velocity of flow. The flowmeter is provided with a light-emitting diode and photosensitive transistor combination which senses the passage of each of the teeth as the rotor is rotating within the cavity. The assembly further includes a spoiler assembly which takes the same general configuration as the rotor, the spoiler assembly being mounted closely adjacent and parallel to the rotor to cause shear drag on the rotor at high flow rates to improve the down side response time of the rotor after the flow of fluid has been decreased. In this way the linearity of the assembly is enhanced.

16 Claims, 7 Drawing Figures

VORTEX FLOWMETER

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BACKGROUND AND SUMMARY OF THE DEVELOPMENT

This invention relates generally to a vortex type flowmeter and more particularly to a vortex flowmeter having a photoelectric, rotor-velocity sensing system and a spoiler system to improve the down side response time of the meter assembly.

A vortex flowmeter generally consists of a confined, generally inverted frustro-conical vortex chamber with a tangential inlet to the vortex chamber and a central outlet. The vortex causes fluid flowing into the chamber to swirl in a generally helical fashion toward the outlet conduit to cause the fluid to increase in velocity as the diameter of the flow path is decreased. Thus, a vortex flowmeter has the tendency to increase the velocity of the fluid through the meter as it is being measured. Typically, a movable unit is provided in the chamber, which unit is acted on by the fluid in the chamber. A measuring system is provided to sense the movement of the movable unit.

In certain prior art flowmeters, it has been proposed to introduce a ball in a raceway within the vortex cavity, which ball is moved along an interior diameter of the vortex cavity by the swirling fluid to be measured. In this system, a magnetic pickup is provided which generally consists of a permanent magnetic and a pickup coil arrangement, which arrangement senses the passage of the ball through the magnetic circuit. As the ball approaches the magnetic circuit, the reluctance of the circuit is decreased, which reduction in reluctance is sensed by the pickup coil. Also, other systems have contemplated the provision of a reed switch pickup arrangement to sense the passage of the ball.

In systems of the type described above, it is seen that the ball provides a single pulse per revolution of the ball within the vortex cavity, which results in a low resolution as only a single revolution of the ball per revolution of fluid is created. Also, magnetic pickups and reed switch pickups create a drag on the ball due to the interaction between the ball and the magnetic circuit in the case of the pickup coil arrangement and the magnetic interaction between the ball and the reed switch in the case of the reed switch arrangement. Thus, serious problems are introduced to the measuring of relatively low flow rates.

Also, in systems such as described above, a problem is introduced in the response time of the meter when the fluid flow is suddenly reduced or cut-off due to the fact that the fluid tends to continue swirling and the ball continues its travel even after the reduction in flow rate has been achieved. Thus, it has been desired to improve the response time on the down side of the flowmeter cycle at high flow rates.

With the system of the present invention, it is contemplated that the interior vortex cavity is provided with a toothed rotor and a light-emitting diode-phototransistor sensing arrangement whereby the passage of each tooth is sensed by the diode-phototransistor sensing system. In the system of the present invention, the rotor is fabricated of a generally unitary structure with a plurality of teeth formed therein, the number of teeth being selected to achieve the desired resolution at low flow rates. Further, the light-emitting diode and phototransistor arrangement is positioned to bridge the gap through which each tooth is passing to sense the passage of each of the rotor teeth. In this way, a large number of pulses per revolution may be generated to achieve resolutions of, for example, twenty-two to twenty-four hertz at a low flow rate of approximately five pounds per hour and nine hundred hertz at a high flow rate of approximately a hundred and fifty pounds per hour. It has been found that an accuracy of approximately a quarter of a percent of the value read may be achieved.

With regard to the problem of improving the response time on the down side of the measuring cycle, the assembly of the present invention includes a spoiler arrangement which generally takes the shape of a spider similar to the rotor utilized in the vortex cavity. This spider is mounted proximate the rotor and parallel thereto, the spider being formed with teeth facing the rotor teeth. With this arrangement, fluid is trapped between the spider teeth to create a static fluid condition. With this static fluid condition, the passage of swirling fluid past the static fluid creates a fluid shear drag condition which tends to cause the rotor to slow down at a faster rate when the fluid has been cut off. Thus, the response time on the down side of the cycle is greatly improved.

Accordingly, it is one object of the present invention to provide an improved vortex flowmeter.

It is another object of the present invention to provide an improved vortex flowmeter having a high resolution relative to prior systems.

It is a further object of the present invention to provide an improved vortex flowmeter having a relatively low drag due to the rotational pickup system.

It is a further object of the present invention to provide an improved vortex flowmeter having a resolution which is as high as is desired consistent with providing the proper interaction between the swirling fluid and the rotational member to be sensed.

It is a further object of the present invention to provide a spoiler arrangement for use in a fluid flowmeter to enhance the down side response time of the flowmeter.

It is still another object of the present invention to provide an improved vortex flowmeter down side response time by providing an assembly for creating a fluid shear drag on the rotating fluid after the source of fluid has been reduced or cut off.

Further objects, features and advantages of this invention will become apparent from a consideration of the following description, the appended claims and the accompanying drawings in which:

Figure 1:
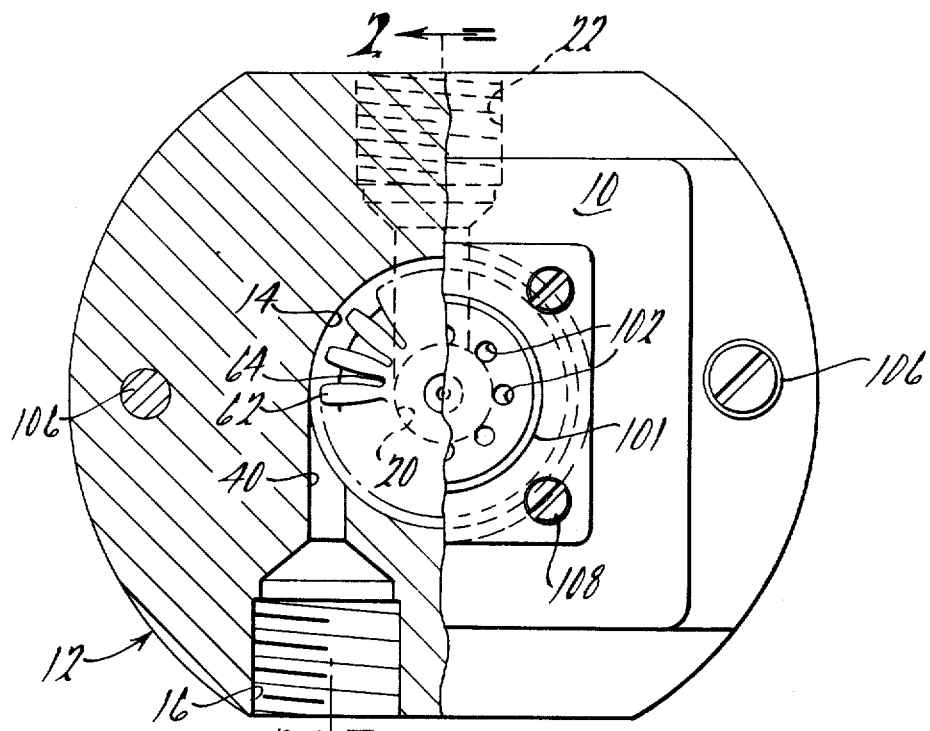
FIG. 1 is an end view, partially broken away, of a flowmeter incorporating certain features of the present invention.
Figure 2:
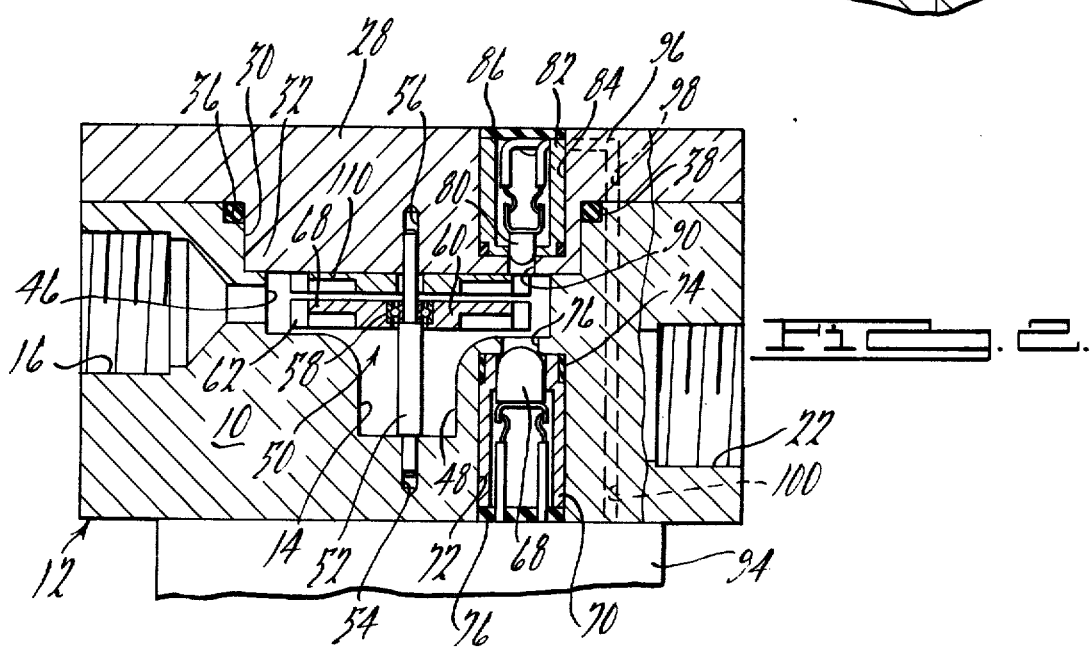
FIG. 2 is a cross-sectional view of FIG. 1 taken along line 2—2 thereof.

Referring now to FIGS. 1 and 2, there is illustrated a flowmeter assembly 10 which incorporates the features of the present invention. The flowmeter 10 basically includes a body member 12 which may be cast or otherwise formed to provide a vortex flow chamber 14, the vortex flow chamber being provided with a tangential flow of fluid at the greatest diameter thereof by means of an inlet port 16. The outlet for the chamber 14 is provided at the least diameter portion of the vortex chamber 14, the outlet 20 being concentrically located within the chamber 14 and being in fluid connection with an output port 22. As is seen from FIGS. 1 and 3, the outlet port 22 is tangential to the small diameter portion of the chamber 14.

Referring to FIG. 2, it is seen that the assembly 10 is illustrated in cross section wherein the body portion 12 is illustrated as forming the cavity 14, the cavity being closed by a cover member 28. The body portion 12 is formed with a countersunk aperture 30 into which a projection 32 of the cover member 28 fits to close the chamber 14. The body member 12 has also been formed with an interior groove 36, the groove being adapted to receive an O-ring 38 to provide a further seal for the interior cavity of the body 12.

Figure 3:
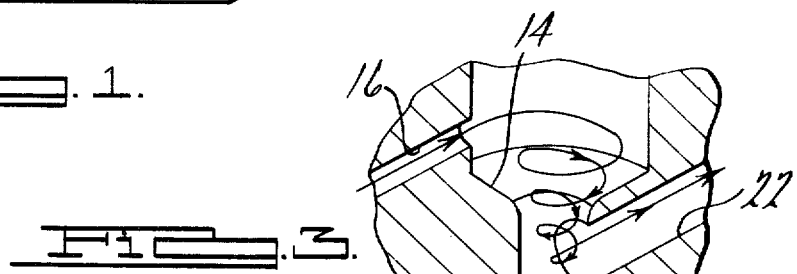
FIG. 3 is a perspective schematic view illustrating the principle of a vortex flowmeter.

FIGS. 2 and 3 best illustrate the flow of fluid from the entry port 16 to the exit port 22, the entry port 16 including a small diameter jet 40, one portion of the interior wall of which enters the cavity 14 along a tangent to the largest diameter of the cavity 14. In this way a tangential flow of fluid is introduced into the vortex cavity at the largest diameter thereof. Fluid introduced at inlet 16 flows along the wall 46 of the largest diameter portion to form a swirling action, the vortex of the swirl being concentric with a small diameter portion 48. The exit port 20 is positioned as illustrated in dotted lines in FIG. 1 so that the fluid is drawn from the cavity 14 at the center of the vortex.

FIG. 3 illustrates the flow of fluid in schematic form wherein fluid is introduced at the inlet port 16, flows in the vortex chamber 14 and is exited at the exit port 22. From the schematic drawings it is seen that a vortex is formed, the diameter of the swirling fluid decreasing as the fluid flows from the inlet to the outlet ports. In accordance with common fluid dynamic principles, the fluid velocity as it enters the port 16 multiplied by the diameter from the center of the vortex is equal to the fluid velocity as it is exited from the vortex chamber multiplied by the diameter of the fluid from the center of the vortex. Thus, the fluid increases in velocity as the diameter of the fluid flow from the center of the vortex decreases.

The swirling fluid reacts with a rotor assembly 50, the rotor assembly including a shaft 52 which is journalled in an aperture 54 in the body portion and an aperture 56 in the cover portion. The rotor assembly includes a bearing assembly 58, the inner race of which is journalled on the shaft 52 and the outer race of which is journalled on an interior aperture of a rotor member 60. Thus, the rotor 60 is adapted to rotate relative to the shaft 52 in response to the interaction between the rotor 60 and the swirling fluid introduced into input port 16.

The rotor 60 is formed generally of a flat disc with a plurality of teeth 62 formed therein, the teeth being formed with a central root 64 for each adjacent pair of teeth. The rotor also includes a plate portion 68 which does not extend to the outer periphery of the teeth 62. Thus, a groove is formed between adjacent teeth which extends from the tip of the tooth to a distance approximately one-quarter to one-third of the radius of the rotor. Also, a portion of the tooth is formed on one face of the integral plate 68. Thus, the teeth on one face of the rotor element 60 extend from approximately one-fourth of the distance from the shaft 52 toward the outer diameter of the rotor 60 to the extreme outer diameter of the rotor 60. At the extreme outer edge of the rotor 60, the teeth extend completely through the rotor body.

As described above, the movement of the rotor is sensed by means of a light-emitting diode and phototransistor arrangement, the phototransistor and light-emitting diode arrangement being separated, one from the other, across the space defined by the large diameter portion 46 and the vortex cavity 14. The rotor 60 is adapted to rotate in this space, the through portion of the rotor teeth forming a light path between the light-emitting diode and phototransistor through the fluid swirling within the cavity 14.

Specifically, a light-emitting diode 68 is mounted within a sleeve 70, the sleeve 70 being positioned and cemented within a hole 72 formed in the body 12. A suitable sealing element 74 is provided to further seal the aperture 72 and a potting compound 76 closes the exterior portion of the aperture 72. It is to be understood that the sealing element 74 may also be a potting compound. The light-emitting diode 68 is adapted to shine light through a hole 76 formed in the body and concentric with the hole 72 but of lesser diameter than the hole 72. This directs light across the gap formed by the large diameter portion 46 to be sensed by a phototransistor element 80. The phototransistor 80 is similarly mounted within a sleeve 82 cemented within an aperture 84 formed in cover member 28. Again, a potting compound 86 is utilized to seal the aperture 84.

It will be seen from an inspection of FIG. 2, the light emitted by diode 68 shines across the large diameter portion 46 into a small aperture 90 formed in the cover 28 to be received by the phototransistor 80. The rotor element 62, positioned between the light-emitting diode 68 and phototransistor 80, will chop the light being transmitted through the fluid swirling within the cavity 14. In this way, the phototransistor 80 is periodically energized to cause conduction of the phototransistor 80 in response to the chopped light generated across the gap 46. It is to be noted that the frequency of the energization of phototransistor 80 will be directly related to the number of times that a tooth of the rotor 60 passes within the gap formed by large diameter portion 46. As will be seen from a description of FIG. 7, this energization of the phototransistor 80 will be translated into a series of pulses for use by a frequency responsive meter.

Figures 4, 5:
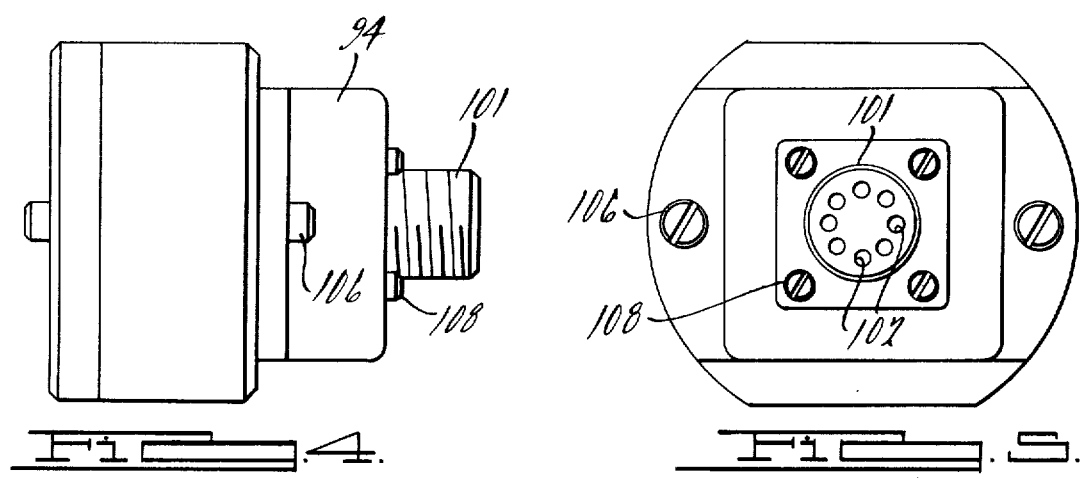
FIG. 4 is a side view of the flowmeter of FIG. 1 in full line.
FIG. 5 is an end view of the flowmeter of FIG. 1 in full line.
Figure 6:
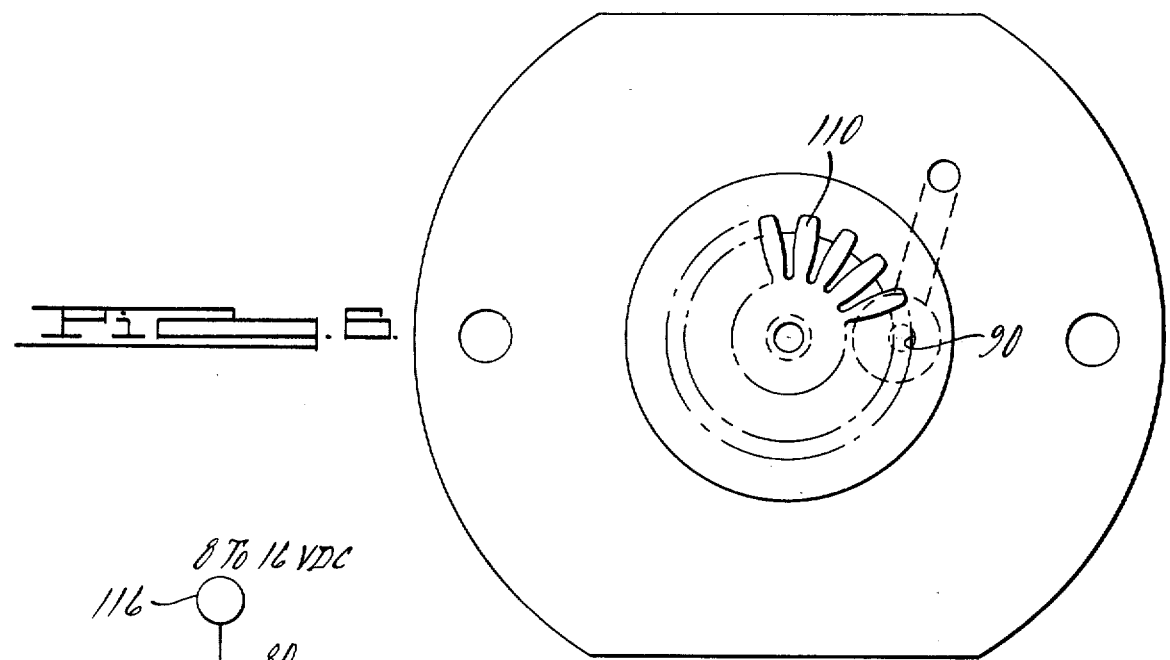
FIG. 6 is a view of the spoiler unit illustrating a portion of the teeth in full line, the spoiler corresponding to the spoiler illustrated in section in FIG. 2.

Referring particularly to FIGS. 2, 4, and 5, it is seen that the leads from the phototransistor 80 are directed to a connector assembly 94 through a first groove 96 formed in the cover member, a second groove 98 also formed in the cover member and a third groove 100 formed in the body of the assembly. Thus, the leads for the phototransistor 80 are led to the opposite side of the flowmeter assembly. The groove 96 may be suitably closed by any potting material available for this purpose. The leads for the light-emitting diode 68 are also led into the connector assembly 94 by directly passing the leads through the potting compound 76.

FIGS. 4 and 5 illustrate the connector assembly 94 which includes a mechanical connector 101 which is adapted to connect to a suitable male connector (not shown). As is typical, the connector 100 includes a plurality of pins 102 which are adapted to be connected to the leads associated with the light-emitting diode and the phototransistors 68, 80, respectively. The entire assembly is held together by suitable fastener means 106 and the connector assembly is attached to the body member by means of suitable connectors 108.

As was stated above, the rotor 60 is mounted on bearing elements 58 and has a tendency to coast after the supply of fluid is cut off from the flowmeter assembly. Thus, the down side linearity of the flowmeter is greatly affected by the viscosity of the fluid, the flow rate at which the fluid is being admitted to the flowmeter before being cut off, and the degree of reduction of flow to the flowmeter. In order to enhance the linearity of the flowmeter on the down side, a spoiler assembly 110 has been provided to decrease the coasting effect of the rotor after the flow of fluid to the flowmeter has been reduced. This spoiler 110 has been selected, in the case of the instant invention, to be a structure which is identical in configuration to the rotor 60 but slightly thinner in cross section. This spoiler 110 is mounted on a face of the cover element 28 and parallel to and concentric with the rotor element 60. The teeth of the spoiler 110 are again identical to the teeth formed in the rotor element 60; however, the plate member 68 is slightly thinner.

As was stated above, the spoiler 110 creates a shear drag force on the rotor with the swirling fluid within the cavity 14. When the flow of fluid is reduced to the cavity, the fluid trapped within the teeth of the spoiler 110 creates the drag force which reacts with the rotor 60 to cause the rotor 60 to follow a coasting curve which is greatly reduced in duration as the rotor approaches a speed very nearly that of the swirling fluid.

The portion of the rotor 60 facing the shear drag element 110 is illustrated as being a relatively flat plate to reduce the amount of drag created and thereby enhance the ability of the fluid to accelerate the rotor when the flow of fluid is being increased either from zero or to a flow to be measured or from a lower flow to a higher flow. The spacing between the shear element 110 and the rotor 60 is selected to be a compromise between the ability of the fluid to accelerate the rotor upon an increase in fluid flow and the ability of the rotor to follow the flow of fluid on the down side as the flow is being reduced. Obviously, the configuration of the shear drag element 110, or the rotor 60, may be changed to produce different configurations for the spoiler element 110 or the rotor 60. However, with the preferred configuration illustrated, a reduction in cost of the unit is provided due to the fact that similar elements may be produced from the same die.

In producing the rotor element 60, a silicon rubber mold is made from a gear having a 14-½° press angle, with a twenty pitch and sixteen teeth. This silicon rubber mold is utilized to produce the rotor element, the rotor element being molded from an epoxy. The two surfaces of the rotor are concentric with and parallel to each other. The spoiler element 110, in the preferred embodiment, has been selected to be slightly thinner than the rotor element. However, it is to be understood that the rotor may be utilized for the spoiler element 110.

Figure 7:
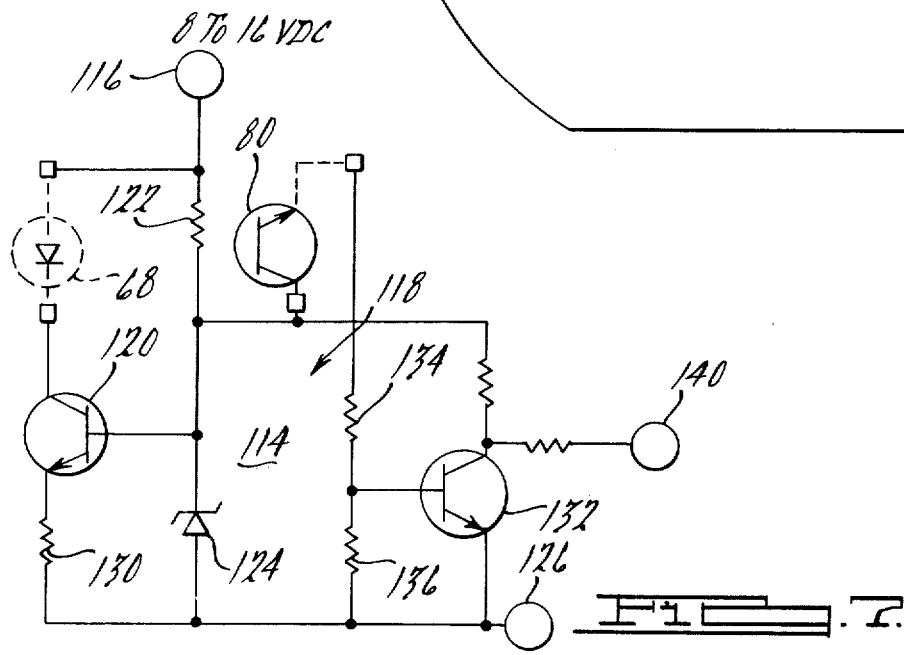
FIG. 7 is a schematic diagram illustrating one preferred pickup system and amplifier circuit which is adapted to be utilized in conjunction with the flowmeters of FIGS. 1 to 6.

Referring now to FIG. 7, there is illustrated a preferred circuit for translating the movement of the rotor between the light-emitting diode and the phototransistor to a series of pulses which may be fed to a frequency meter or like pulse measuring device. Specifically, the circuit 114 includes the light-emitting diode which is fed from a positive source of potential at input terminal 116, the terminal being fed 8 and 10 volts positive DC. The current through the light-emitting diode is controlled by means of a constant current circuit 118 which includes a bias circuit for a transistor 120, the bias circuit including a current limiting resistor 122 and a zener diode 124. The zener diode 124 is connected between the base electrode of the transistor 120 and a common electrode 126. The collector-emitter circuit of the transistor 120 also includes a resistor 130. Thus, the voltage at input terminal 116 causes the zener diode 124 to avalanche thereby feeding a precise base-emitter bias voltage to the transistor 120. This will cause the transistor 120 to conduct at a constant current level.

This constant current is fed through the light-emitting diode 68, the light-emitting diode 68 being positioned in proximity to the phototransistor 80 as particularly illustrated in FIG. 2. As described in connection with the desciption of FIG. 2, the rotor blades 62 pass between the light-emitting diode 68 and the phototransistor 80 to chop the flow of light between light-emitting diode 68 and transistor 80. This causes the transistor 80 to intermittently conduct in synchronism with the passage of the space between two teeth.

The conduction of transistor 80 causes a transistor 132 to conduct due to the connection of the transistor 80 between the positive source of potential at terminal 116 and a base-emitter biasing circuit including resistors 134, 136. When the transistor 80 conducts, a voltage will be developed across resistor 136 to cause transistor 132 to conduct. The conduction of transistor 132 will cause the voltage at an output terminal 140 to drop to very nearly the potential at the common terminal 126. Thus, the output terminal will provide negative going pulses each time that the transistor 132 conducts.

While specific configuration of elements and materials and dimensions have been illustrated, it is to be understood that many modifications and variations to the device and circuitry disclosed may be made. For example, the body member 12 may be molded from a non-metallic material and the reduced diameter portion may be formed in a generally frusto-conical shape to provide a linear transition of diameters from the largest to the smallest diameter of the cavity 14. These modifications may be made within the keeping of the spirit of the invention.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed:

1. A vortex flowmeter comprising a body structure having a cavity formed therein, said cavity having a varying diameter from a large diameter section to a small diameter section, an inlet port positioned generally tangential to said large diameter portion and an outlet port positioned adjacent said small diameter portion for permitting the flow of fluid through said cavity in a generally swirling manner, a rotor positioned in said cavity having a plurality of teeth formed thereon, spoiler means positioned adjacent said rotor and in fluid coupling therewith, said coupling creating a shear drag on said rotor to improve the down side response time of said rotor, and a pickup system positioned to sense the passage of said teeth in response to the flow of fluid in said cavity.

2. The flowmeter of claim 1 wherein said spoiler means includes teeth formed therein to receive fluid from said inlet port, said teeth trapping fluid therebetween.

3. The flowmeter of claim 2 wherein said trapped fluid creates a static condition for said fluid, said static fluid reacting with other fluid between said rotor and spoiler means to slow the rotor down in a lesser period of time when the flow of fluid is reduced at said inlet port.

4. The flowmeter of claim 3 wherein said spoiler means takes the same general configuration as said rotor.

5. The flowmeter of claim 4 wherein said spoiler means is positioned parallel to said rotor and in the path of fluid flow from said inlet port.

6. The flowmeter of claim 5 further including a cover member, said cover member mating with said body structure to close said cavity.

7. The flowmeter of claim 6 wherein said spoiler means is mounted on said cover member within said cavity.

8. The flowmeter of claim 7 wherein said body structure and said cover member include holes formed therein, one of said source and said pickup being positioned in said cover member and the other of said source and pickup being positioned in said body structure.

9. The flowmeter of claim 8 wherein said source shines through the teeth of said spoiler means.

10. A flowmeter comprising a body structure having a cavity formed therein, an inlet port positioned generally tangential to said cavity and an outlet port positioned remote from said inlet port for permitting the flow of fluid through said cavity in a generally swirling manner, a rotor positioned in said cavity having a plurality of teeth formed thereon, a pickup system positioned to sense the passage of said teeth in response to the flow of fluid in said cavity, and spoiler means positioned adjacent to and in fluid coupling with said rotor to reduce the slowdown time of said rotor when the flow of fluid to said cavity is reduced.

11. The flowmeter of claim 10 wherein said spoiler means includes teeth formed therein to receive fluid from said inlet port, said teeth trapping fluid therebetween.

12. The flowmeter of claim 11 wherein said trapped fluid creates a static condition for said fluid, said static fluid reacting with other fluid between said rotor and spoiler means to slow the rotor down in a lesser period of time when the flow of fluid is reduced at said inlet port.

13. The flowmeter of claim 12 wherein said spoiler means takes the same general configuration as said rotor and said spoiler means is positioned parallel to said rotor and in the path of fluid flow from said inlet port.

14. The flowmeter of claim 13 further including a cover member, said cover member mating with said body structure to close said cavity.

15. The flowmeter of claim 14 wherein said spoiler means is mounted on said cover member within said cavity.

16. The flowmeter of claim 15 wherein said body structure and said cover member include holes formed therein, one of said source and said pickup being positioned in said cover member and the other of said source and pickup being positioned in said body structure and wherein said source shines through the teeth of said spoiler means.

* * * * *